(12) United States Patent
Racine

(10) Patent No.: US 9,879,743 B2
(45) Date of Patent: Jan. 30, 2018

(54) AIR SPRING WITH SLIDING ELEMENT

(71) Applicant: ContiTech France SNC, Gennevilliers (FR)

(72) Inventor: Jerome Racine, Gennevilliers (FR)

(73) Assignee: ContiTech France SNC, Gennevilliers (FR)

( * ) Notice: Subject to any disclaimer, the term of this patent is extended or adjusted under 35 U.S.C. 154(b) by 0 days.

(21) Appl. No.: 15/029,635

(22) PCT Filed: Jul. 29, 2014

(86) PCT No.: PCT/EP2014/066217
§ 371 (c)(1),
(2) Date: Apr. 15, 2016

(87) PCT Pub. No.: WO2015/055331
PCT Pub. Date: Apr. 23, 2015

(65) Prior Publication Data
US 2016/0230829 A1  Aug. 11, 2016

(30) Foreign Application Priority Data
Oct. 16, 2013  (EP) .................................... 13290247

(51) Int. Cl.
| B60G 11/27 | (2006.01) |
| F16F 9/04 | (2006.01) |
| B61F 5/10 | (2006.01) |
| F16F 9/05 | (2006.01) |

(52) U.S. Cl.
CPC ............ F16F 9/0445 (2013.01); B60G 11/27 (2013.01); B61F 5/10 (2013.01); F16F 9/05 (2013.01); B60G 2202/152 (2013.01)

(58) Field of Classification Search
CPC ............................... F16F 9/0445; B60G 11/27
See application file for complete search history.

(56) References Cited

U.S. PATENT DOCUMENTS

| 2,999,681 | A | * | 9/1961 | Muller | F16F 9/0445 267/64.27 |
| 3,081,075 | A | * | 3/1963 | Selman | F16F 9/0445 105/198.1 |
| 3,549,142 | A | * | 12/1970 | Tilton | F16F 9/0409 267/64.24 |
| 6,361,028 | B1 | * | 3/2002 | Hubbell | F16F 9/0409 267/64.19 |

(Continued)

FOREIGN PATENT DOCUMENTS

| DE | 1914391 A1 | 4/1965 |
| DE | 1264877 B | 3/1968 |

Primary Examiner — Bradley T King
(74) Attorney, Agent, or Firm — David L. Cate

(57) ABSTRACT

A bellows-type air spring, more particularly a folding-bellows-type air spring having two or more bellows sections designed as folds or toroidal parts, which are separated by rings placed around the air spring bellows, more particularly metal rings, wherein the bellows-type air spring is secured between the sprung and the unsprung mass with the aid of connecting parts, more particularly designed as an air spring cap and an air spring rim or piston, and wherein the bellows project outward in the manner of a balloon between the connecting parts, or the folds or toroidal parts of the bellows project outward in the manner of a balloon between or adjacent to the rings.

13 Claims, 5 Drawing Sheets

(56) References Cited

U.S. PATENT DOCUMENTS

| | | | |
|---|---|---|---|
| 2008/0177011 A1* | 7/2008 | Tamura | F16F 9/055 525/471 |
| 2014/0246818 A1* | 9/2014 | Smith | B60G 11/27 267/64.27 |
| 2015/0167772 A1* | 6/2015 | Street | F16F 9/0454 267/64.27 |
| 2016/0107496 A1* | 4/2016 | Pielock | F16F 9/0409 267/64.27 |

* cited by examiner

AIR SPRING WITH SLIDING ELEMENT

CROSS REFERENCE TO RELATED APPLICATIONS

This application is a continuation application of international patent application PCT/EP2014/066217, filed Jul. 29, 2014, designating the United States and claiming priority from European patent application 13290247.9, filed Oct. 16, 2013, and the entire content of these applications is incorporated herein by reference.

FIELD OF THE INVENTION

The invention relates to a bellows-type air spring, more particularly a folding-bellows-type air spring, useful for cushioning a vehicle running gear.

BACKGROUND

This section provides background information to facilitate a better understanding of the various aspects of the disclosure. It should be understood that the statements in this section of this document are to be read in this light, and not as admissions of prior art.

Bellows-type air springs or folding-bellows-type air springs are known in the prior art. DE 1 914 391 U discloses a bellows-type air spring having two or three toroidal parts separated by metal intermediate rings, in which the intermediate rings are formed by perforated metal plates that have the cross section of a horizontal eight in order to achieve better centering and better transverse stability of the air spring.

Bellows-type air springs or folding-bellows-type air springs of conventional design have the disadvantage that, when subjected to heavy loads and transverse forces acting on the air spring, adjacent toroidal parts or folds come into contact either with one another and hence into frictional contact or with adjoining connecting sections. Thus, contact can occur between adjacent toroidal parts or folds particularly in the case of folding-bellows-type air springs for street cars or rail vehicles, which must have only a relatively small overall height. The frictional contact which occurs here can lead to severe heating of the bellows sections that are correspondingly in contact, which are then subject to increased frictional wear. In extreme cases, this can lead to parts of the fabric plies arranged as reinforcing elements in the bellows wall being exposed.

DE 475626 C discloses an air spring for a motor vehicle in which the metal rings consist of annular plates of a width such that the annular plates can completely support the individual tubular portions or toroidal parts when subject to a load without the adjacent toroidal parts coming into contact. Although the problems with frictional wear which have been mentioned are somewhat mitigated here by the friction occurring only between rubber and metal, they are far from being prevented to a satisfactory extent.

SUMMARY

This section provides a general summary of the disclosure, and is not a necessarily a comprehensive disclosure of its full scope or all of its features.

In an embodiment of the disclosure, a folding-bellows-type air spring includes two or more bellows sections designed as folds or toroidal parts which are separated by rings placed around the air spring bellows. The spring further includes connecting parts designed as an air spring cap and an air spring rim or piston for securing the folding-bellows-type air spring between a sprung and an unsprung mass. Sliding elements are arranged between adjacent bellows sections and/or between bellows sections and connecting sections, against which the bellows sections or folds or toroidal parts come to rest when a load is applied to the folding-bellows-type air spring.

In some aspects, the sliding elements are annular sliding discs made of a low-friction plastics material, which, when in frictional contact with one another or with the material of the folding-bellows-type air spring, has a lower coefficient of friction than the material of the folding-bellows-type air spring when in frictional contact with itself or with the material of the connecting parts.

In some aspects, the sliding elements are annular sliding discs arranged to slide on one another and have an inside diameter greater than the outside diameter of the rings separating the folds or toroidal parts. The annular sliding discs may be arranged between adjacent folds or toroidal parts. The folds or toroidal parts may come to rest upon the annular sliding discs when a load is applied to the folding-bellows-type air spring.

In another embodiment of the disclosure, folding-bellows-type air spring includes two or more bellows sections designed as folds or toroidal parts which are separated by rings placed around the air spring bellows, and connecting parts designed as an air spring cap and an air spring rim or piston for securing the folding-bellows-type air spring between a sprung and an unsprung mass. The spring further includes annular sliding discs arranged between adjacent bellows sections and/or between bellows sections and connecting sections, against which the bellows sections or folds or toroidal parts come to rest when a load is applied to the folding-bellows-type air spring. The annular sliding discs are further arranged to slide on one another, and the annular sliding discs have an inside diameter greater than the outside diameter of the rings separating the folds or toroidal parts.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
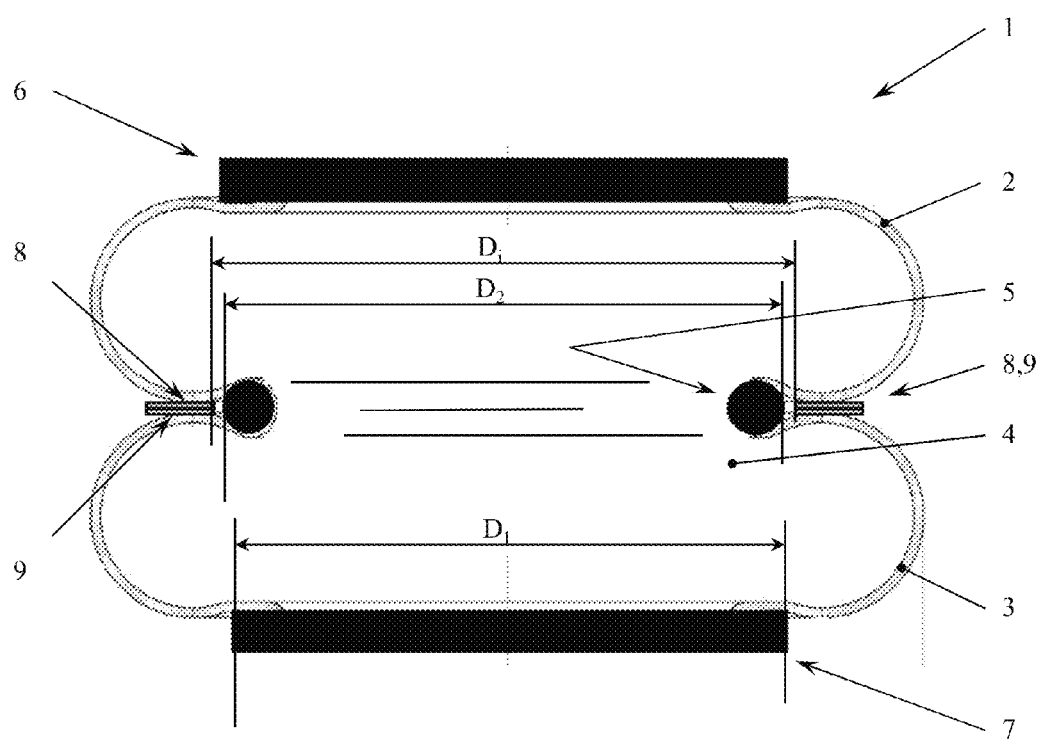
FIG. 1 shows a bellows-type air spring according to the invention designed as a folding-bellows-type air spring.

It is therefore the object of the invention to provide a bellows-type air spring, more particularly a folding-bellows-type air spring, which eliminates the problem of increased frictional wear on adjacent toroidal parts, folds or connecting sections under high loads and transverse forces, which, at the same time, is simple to produce and which does not make additional demands on installation space or require relatively high use of additional parts.

This object is achieved by means of the features of the main claim. Further advantageous embodiments are disclosed in the dependent claims.

In this case, sliding elements, more particularly annular sliding elements designed as sliding discs, are arranged between adjacent bellows sections and/or between bellows sections and connecting sections, against which sliding elements the bellows sections or folds or toroidal parts come to rest when a corresponding load is applied to the bellows-type or folding-bellows-type air spring. By virtue of a greatly reduced coefficient of sliding friction, such sliding discs as sliding elements avoid heating when there are movements of the loaded toroidal parts relative to one another or of the bellows sections relative to the connecting parts and avoid corresponding wear of the bellows material, in the case of rubber this involving degradation of the rubber matrix.

For this reason, an advantageous development also consists in that the sliding elements/annular sliding discs are composed of a material, preferably a low-friction plastics material, which, when in frictional contact with itself or with the material of the bellows-type air spring/folding-bellows-type air spring, has a lower coefficient of friction than the material of the bellows-type air spring/folding-bellows-type air spring when in frictional contact with itself or with the material of the connecting sections.

Another advantageous embodiment in the case of a bellows-type air spring designed as a folding-bellows-type air spring consists in that in each case at least two annular sliding discs arranged so as to slide on one another, the inside diameter of which is greater than the outside diameter of the rings separating the folds or toroidal parts, are arranged between adjacent folds or toroidal parts against which the folds or toroidal parts come to rest when a load is applied to the folding-bellows-type air spring. In such an arrangement, it is then essentially only the sliding element/ sliding discs which slide on one another, thereby once again greatly reducing friction and the associated heat generation, in particular, of course, even when the annular sliding discs or sliding elements arranged so as to slide on one another are composed of different materials matched in terms of their antifriction properties, preferably of low-friction plastics materials or of different low-friction plastics materials. Such low-friction materials can be polytetrafluoroethylene (PTFE) or ultra-high-density polyethylene (PE-UHMW).

Another advantageous embodiment consists in that in each case either at least two annular sliding discs arranged so as to slide on one another or at least one sliding disc and a further cap-shaped sliding element are arranged between the bellows sections and the connecting sections on which the bellows sections come to rest when a load is applied to the bellows-type air spring or folding-bellows-type air spring. It is thereby possible to reliably protect particularly the connecting regions, i.e. the mountings of the bellows-type air spring, from excessive thermal stress due to friction as the folding-bellows-type air spring rolls or comes to rest on the connecting parts.

Another advantageous embodiment consists in that the annular sliding discs or sliding elements arranged so as to slide on one another are arranged so as to move radially against one another or so as to rotate against one another in a sliding motion, with the result that severe or even oscillating transverse forces and rotary movements acting on the bellows-type air spring or folding-bellows-type air spring or a torque acting on the bellows does/do not lead to thermal stresses due to friction.

Another advantageous embodiment consists in that the annular sliding discs or sliding elements are of asymmetrical design and cover further bellows regions of the folding-bellows-type air spring at least in one circular segment. This prevents the bellows-type air spring from coming to rest on surrounding components, e.g. other running gear components, in the central region of a folding-bellows-type air spring for example, that is to say in the region remote from the connecting parts, when loads are imposed, with the result that, here too, no thermal stress due to friction can occur.

The reduction in the unwanted friction is promoted by further advantageous embodiments, which consist in that the annular sliding discs or sliding elements are of concave or convex design in cross section and/or in that the annular sliding discs or sliding elements are designed to be so flexible that they come to rest on the bellows regions when a load is applied to the folding-bellows-type air spring.

Such a bellows-type air spring according to the invention is particularly well-suited to the cushioning of a vehicle running gear in which high static and dynamic supporting loads and high transverse forces act, that is to say particularly as a secondary spring system of a rail vehicle or as a spring system of a motor vehicle. Of course, the bellows-type air spring according to the invention is likewise suitable as a spring system in the industrial area of application, i.e. as a machine or foundation spring system.

FIG. 1 shows a bellows-type air spring designed as a folding-bellows-type air spring 1 having two bellows sections designed as a fold or toroidal part 2 and 3, which are separated by a metal ring 5 placed around the air spring bellows 4 and thus form two bellows regions projecting outward in the manner of a balloon to the right and left of the metal ring 5.

The folding-bellows-type air spring 1 is secured between a sprung and an unsprung mass (not shown specifically here) with the aid of connecting parts, namely designed as an air spring cap 6 and an air spring rim 7.

Two annular sliding discs 8 and 9 are arranged as sliding elements between the adjacent bellows sections 2 and 3, against which sliding elements the bellows sections can come to rest when a load is applied to the folding-bellows-type air spring.

The two annular sliding discs 8 and 9 arranged so as to slide on one another are composed of PE-UHMW, an extremely low-friction plastics material, which has a significantly lower friction coefficient, either when in frictional contact with itself or with the material of the folding-bellows-type air spring, than the material of the folding-bellows-type air spring when in frictional contact with itself. The inside diameter $D_i$ of the sliding discs 8 and 9 is greater than the outside diameter $D_2$ of the metal ring 5 which is arranged between the adjacent folds or toroidal parts 2 and 3 and also greater than the greatest outside diameter $D_1$ of the bellows rim/air spring rim 7.

Figure 2:
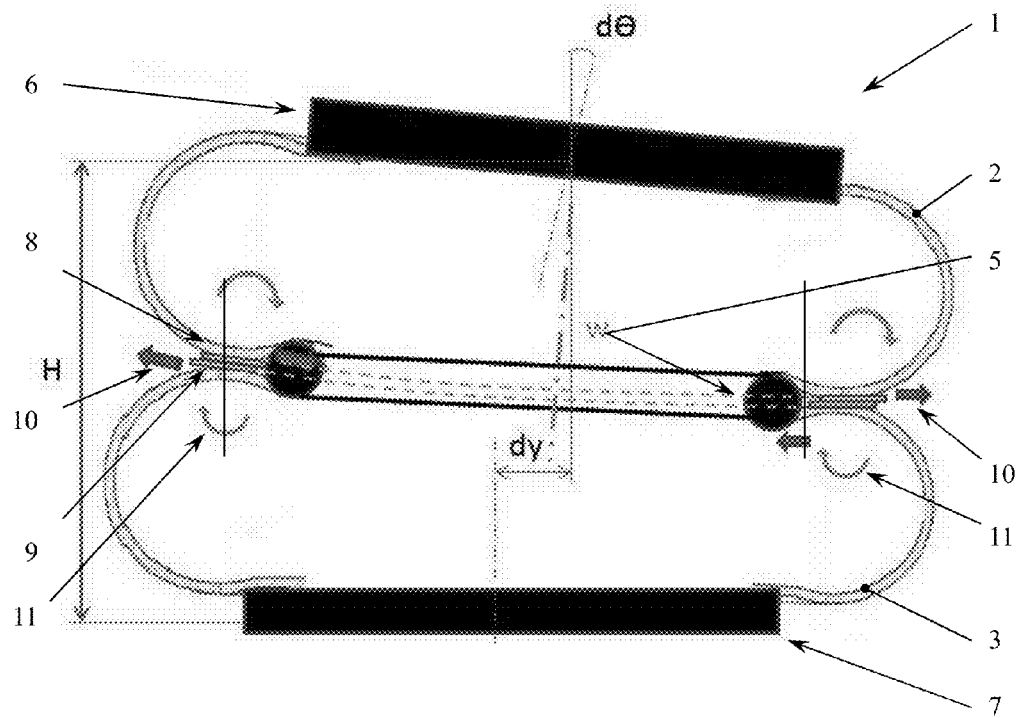
FIG. 2 shows the behavior of the folding-bellows-type air spring shown in FIG. 1 under load and with transverse forces acting.

When viewed in combination with FIG. 2, which shows the behavior of the folding-bellows-type air spring shown in FIG. 1 under load and with transverse forces acting, it can be seen that the folds or toroidal parts 2 and 3 come to rest on the sliding discs 8, 9, with the result that it is not the material of the toroidal parts which slides on itself but the sliding discs which absorb the lateral displacement/friction by sliding on one another. In a sketchy and schematic form, using appropriate movement arrows 10, FIG. 2 illustrates an imposed transverse force with a displacement $d_y$, superimposed on which there is furthermore a tilting moment acting on the folding-bellows-type air spring, said moment having the tilting angle $d_\theta$ and being represented by movement arrows 11. The annular sliding discs or sliding elements are arranged in such a way that they can move radially while sliding against one another.

Figure 3:
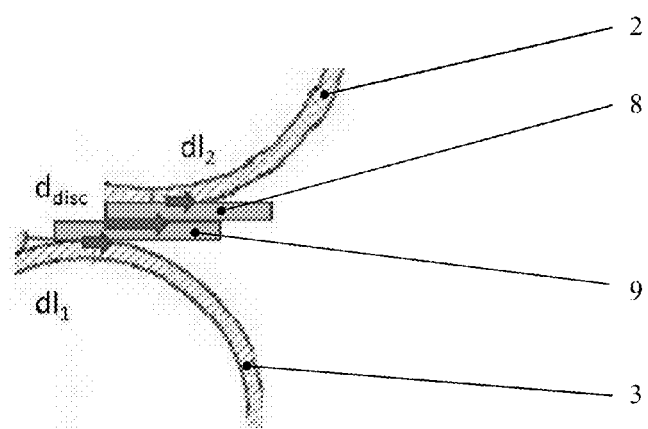
FIG. 3 shows an enlarged detail of the folding-bellows-type air spring in FIG. 2.

As can be seen in the enlarged detail in FIG. 3, both loads cause movements in the region of the sliding discs, namely the relative movements $d_{disc}$ between the sliding discs and the relative movements $d_{11}$ and $d_{12}$ between the toroidal part 2 and the sliding disc 8 and between the toroidal part 3 and the sliding disc 9. The latter movements, i.e. $d_{11}$ and $d_{12}$, are shown here only for factual accuracy and clarity but in fact they are negligibly small and without any significant effect on heat generation due to friction in the case of PE-UHMW sliding discs.

Figure 4:
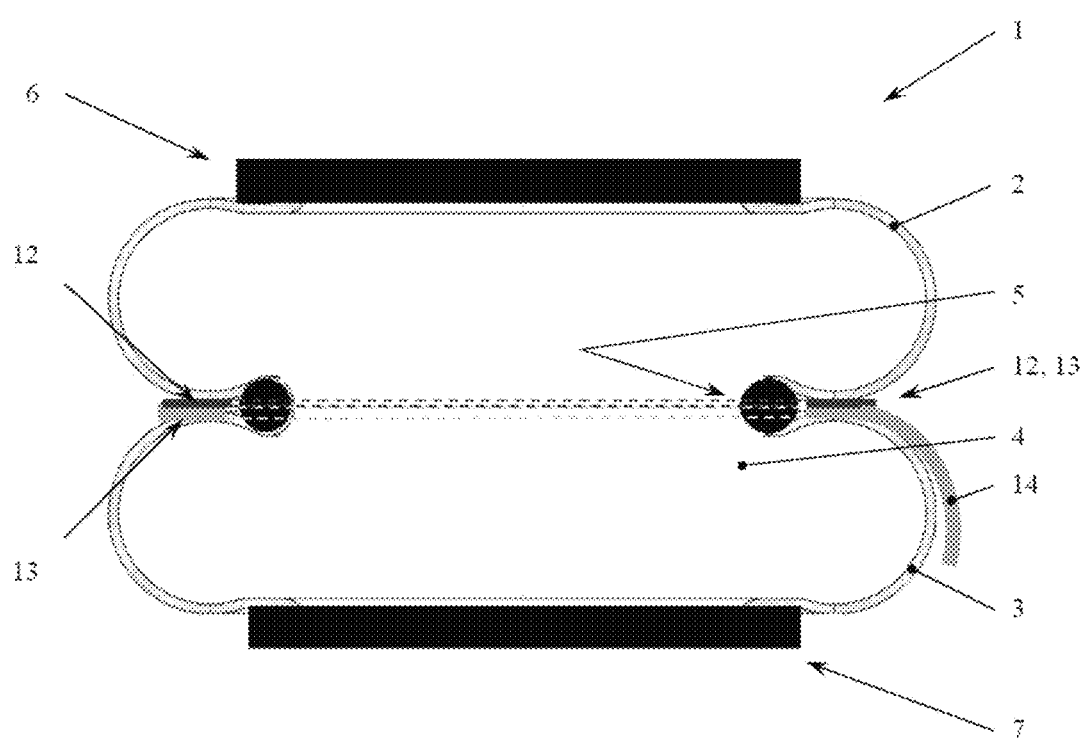
FIG. 4 shows an embodiment of a folding-bellows-type air spring according to the invention having annular sliding discs of asymmetrical design.

FIG. 4 shows an embodiment of the folding-bellows-type air spring 1 according to the invention in which the annular sliding discs 12 and 13 are of asymmetrical design. The lower sliding disc 13 is designed with a tongue 14 over a circular segment situated on the right in FIG. 3, said tongue covering a downward-extending bellows region of the folding-bellows-type air spring. This prevents the folding-bellows-type air spring coming to rest on surrounding components, e.g. other running gear components (although these are not shown specifically here), when under load.

Figure 5:
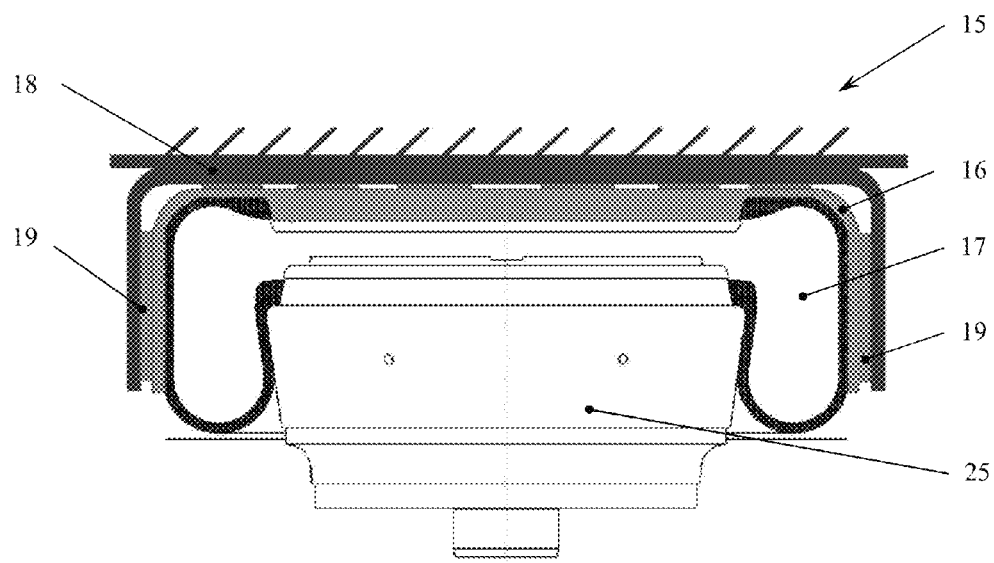
FIG. 5 shows an embodiment of a bellows-type air spring according to the invention for a rail vehicle or a truck without toroidal parts/folds, having two sliding elements.

FIG. 5 shows an embodiment of a bellows-type air spring 15 according to the invention without folds for rail vehicles or trucks, in which a cap-shaped sliding element 16 is provided between the air spring bellows 17 and the upper connecting part, in this case the air spring cap 18, which is arranged so as to slide on an annular sliding disc 19, which in this case is of cylindrical design. Excessive thermal stress due to friction as the bellows-type air spring rolls or comes to rest on the air spring cap 18 can thereby reliably be prevented in the region of the air spring cap, i.e. in the mounting region of the bellows-type air spring 15. Here, the air spring bellows is mounted between the air spring cap 18 and the air spring piston 25.

Figure 6:
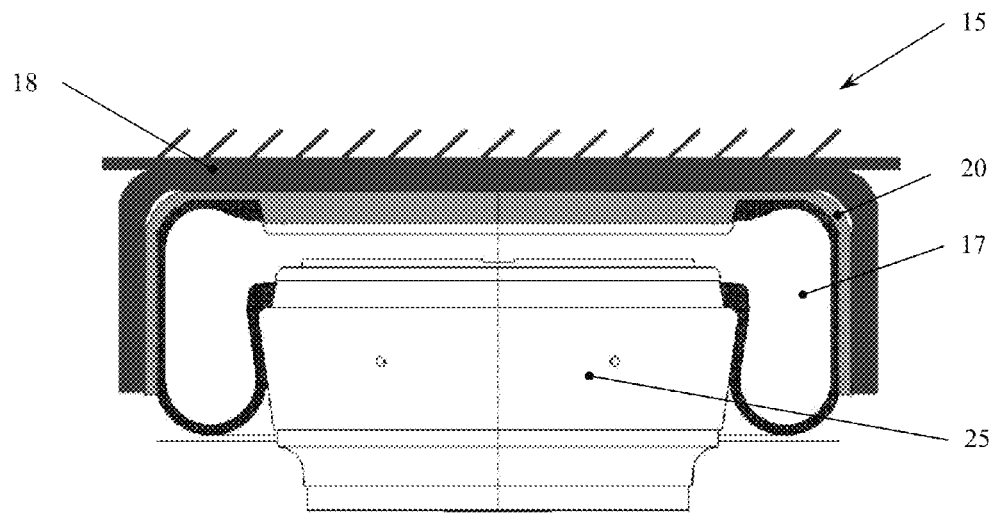
FIG. 6 shows another embodiment of a bellows-type air spring according to the invention as shown in FIG. 5 without toroidal parts/folds, having just one sliding element; and, FIG. 7 shows yet another embodiment of a bellows-type air spring according to the invention for rail vehicles without toroidal parts/folds, having just one sliding element.

FIG. 6 shows a similar embodiment to that in FIG. 5 but with just one cap-shaped sliding element 20 composed of PE-UHMW between the upper air spring bellows 17 and the air spring cap 18. Depending on the use of the folding-bellows-type air spring, a second sliding disc may not be required with this choice of material. Here too, the air spring bellows is mounted between the air spring cap 18 and the air spring piston 25.

Figure 7:
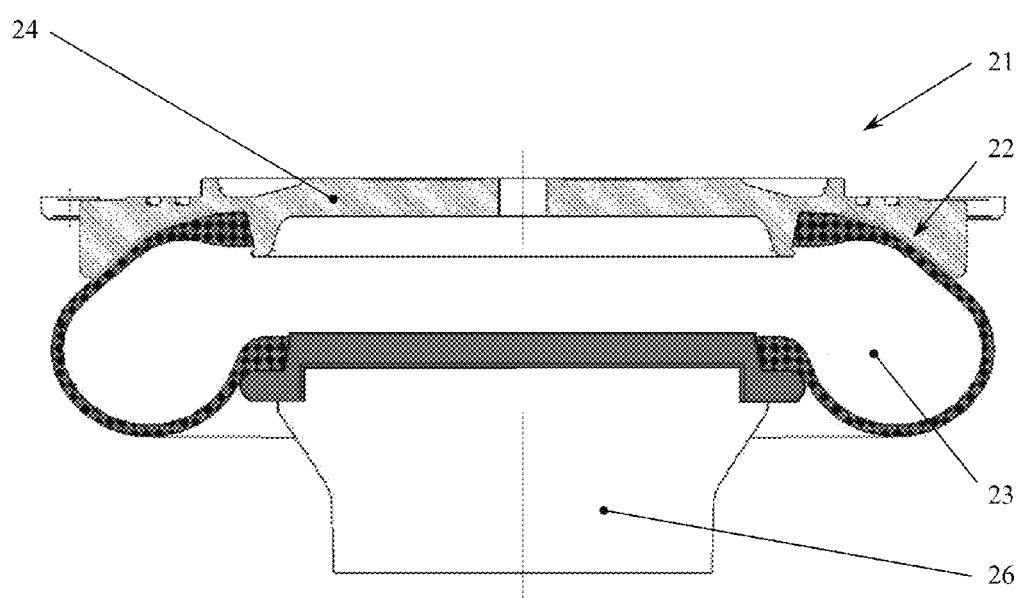

FIG. 7 shows, in greatly simplified form, another embodiment of an air spring 21 without folds for rail vehicles, which has just one toroidal part without separating rings and is likewise provided with just one cap-shaped sliding element 22 composed of PE-UHMW between the air spring bellows 23 and the air spring cap 24. Here too, a second sliding disc is not required. Here, the air spring bellows is mounted between the air spring cap 24 and the air spring rim 26.

LIST OF REFERENCE SIGNS (PART OF THE DESCRIPTION)

1 folding-bellows-type air spring
2 toroidal part/fold
3 toroidal part/fold
4 air spring bellows
5 metal ring/separating ring
6 air spring cap
7 air spring rim
8 sliding disc/sliding element
9 sliding disc/sliding element
10 movement arrow of a displacement $d_y$
11 movement arrow of a tilting movement with the tilting angle $d_\theta$
12 sliding disc/sliding element
13 sliding disc/sliding element
14 tongue
15 bellows-type air spring without folds
16 sliding element
17 air spring bellows
18 air spring cap
19 sliding disc of cylindrical design
20 sliding element
21 air spring
22 sliding element
23 air spring bellows
24 air spring cap
25 air spring piston
26 air spring rim

I claim:

1. A folding-bellows air spring comprising:
    two or more bellows sections designed as folds or toroidal parts which are separated by rings placed around the air spring bellows;
    connecting parts designed as an air spring cap and an air spring rim or piston for securing the folding-bellows air spring between a sprung and an unsprung mass; and,
    sliding elements arranged between adjacent bellows sections against which the folds or toroidal parts come to rest when a load is applied to the folding-bellows air spring;
    wherein the sliding elements are annular sliding discs arranged to slide on one another and having an inside diameter greater than the outside diameter of the rings separating the folds or toroidal parts, wherein the annular sliding discs are arranged between adjacent folds or toroidal parts, and wherein the folds or toroidal parts come to rest upon the annular sliding discs when a load is applied to the folding-bellows air spring.

2. The folding-bellows air spring of claim 1, wherein the folds or toroidal parts of the bellows project outward in the manner of a balloon between or adjacent the rings.

3. The folding-bellows air spring of claim 1, wherein the annular sliding discs comprise a low-friction plastics material, which, when in frictional contact with one another or with the material of the folding-bellows air spring, has a lower coefficient of friction than the material of the folding-bellows air spring when in frictional contact with itself or with the material of the connecting parts.

4. The folding-bellows air spring of claim 1, wherein the annular sliding discs are arranged so as to slide on one another and are arranged so as to move radially against one another or so as to rotate against one another in a sliding motion.

5. The folding-bellows air spring of claim 1, wherein the sliding elements are arranged so as to slide on one another, and wherein the annular sliding discs are comprised of different low-friction plastics materials.

6. The folding-bellows air spring of claim 1, wherein the sliding elements are of asymmetrical design and cover at least in one circular segment of the folding-bellows air spring.

7. The folding-bellows air spring of claim 1, wherein the sliding elements are of concave or convex design in cross section.

8. The folding-bellows air spring of claim 1, wherein the sliding elements are flexible in such way that they come to rest on the bellows regions when a load is applied to the folding-bellows air spring.

9. The folding-bellows air spring of claim 1, wherein the rings placed around the air spring bellows are metal rings.

10. A folding-bellows air spring comprising:
two or more bellows sections designed as folds or toroidal parts which are separated by rings placed around the air spring bellows;
connecting parts designed as an air spring cap and an air spring rim or piston for securing the folding-bellows air spring between a sprung and an unsprung mass; and,
annular sliding discs arranged between adjacent bellows sections and/or between bellows sections and connecting sections, against which the folds or toroidal parts come to rest when a load is applied to the folding-bellows air spring, wherein the annular sliding discs are further arranged to slide on one another, and wherein the annular sliding discs have an inside diameter greater than the outside diameter of the rings separating the folds or toroidal parts.

11. The folding-bellows air spring of claim 10, wherein the folds or toroidal parts of the bellows project outward in the manner of a balloon between or adjacent the rings.

12. A folding-bellows air spring comprising:
two or more bellows sections designed as folds or toroidal parts which are separated by rings placed around the air spring bellows;
connecting parts designed as an air spring cap and an air spring rim or piston for securing the folding-bellows air spring between a sprung and an unsprung mass; and,
sliding elements arranged between adjacent bellows sections and/or between bellows sections and connecting sections, against which the folds or toroidal parts come to rest when a load is applied to the folding-bellows air spring;
wherein the sliding elements are of asymmetrical design and cover at least in one circular segment of the folding-bellows air spring.

13. A folding-bellows air spring comprising:
two or more bellows sections designed as folds or toroidal parts which are separated by rings placed around the air spring bellows;
connecting parts designed as an air spring cap and an air spring rim or piston for securing the folding-bellows air spring between a sprung and an unsprung mass; and,
sliding elements arranged between adjacent bellows sections and/or between bellows sections and connecting sections, against which the folds or toroidal parts come to rest when a load is applied to the folding-bellows air spring;
wherein the sliding elements are arranged so as to slide on one another, and wherein the annular sliding discs are comprised of different low-friction plastics materials.

* * * * *